United States Patent [19]

Watanabe et al.

[11] Patent Number: 4,813,122
[45] Date of Patent: * Mar. 21, 1989

[54] MACHINE TOOL

[75] Inventors: Kikuo Watanabe, Aichi; Mitsuo Kobayashi, Mie; Noboru Hirose; Keiichi Sato, both of Aichi, all of Japan

[73] Assignee: Brother Kogyo Kabushiki Kaisha, Aichi, Japan

[*] Notice: The portion of the term of this patent subsequent to Jul. 14, 2004 has been disclaimed.

[21] Appl. No.: 55,071

[22] Filed: May 28, 1987

Related U.S. Application Data

[63] Continuation of Ser. No. 768,750, Aug. 23, 1985, Pat. No. 4,679,296.

[51] Int. Cl.4 .............................................. B23Q 3/157
[52] U.S. Cl. ...................................... 29/568; 29/26 A; 408/35
[58] Field of Search ................. 29/26 A, 568; 408/35

[56] References Cited

U.S. PATENT DOCUMENTS

| | | | |
|---|---|---|---|
| 3,074,147 | 1/1963 | Miller et al. | 29/26 A |
| 4,355,446 | 10/1982 | Shimajiri et al. | 29/568 |
| 4,679,296 | 7/1987 | Watanabe et al. | 29/568 |

Primary Examiner—Z. R. Bilinsky
Attorney, Agent, or Firm—Finnegan, Henderson, Farabow, Garrett, & Dunner

[57] ABSTRACT

A machine tool with a vertically reciprocating spindle head has an automatic tool changer including a rotatingly indexable tool support connected to the machine tool frame and vertically movable independently of the spindle head, a first cam-and-crank mechanism activated by spindle head vertical movement to move the tool support with the spindle head during a portion of the tool changing operation, a second cam-and-crank mechanism also activated by spindle head vertical movement for opening and closing a tool holder on the tool support during another portion of the tool changing operation, and a vertical stop for preventing vertical movement of the tool support with the spindle head into the machining region.

3 Claims, 9 Drawing Sheets

MACHINE TOOL

This is a continuation of application Ser. No. 768,750 filed Aug. 23, 1985, U.S. Pat. No. 4,679,296.

BACKGROUND OF THE INVENTION

1. Field of the Invention

This invention relates to a machine tool and more particularly to a machine tool equipped with an automatic tool changer (ATC).

2. Description of the Prior Art

In a machine tool such as a multi-purpose machining center (MC) for threading and cutting holes in work pieces, a number of taps and drills are stored in a predetermined place before machining. Using an ATC, the tool being used can be exchanged with another type tool or a new one, automatically. Various kinds of ATC's have been proposed, and one ATC having a relatively simple construction has been disclosed in Japanese Pat. Appln. Laid-Open No. 58-51046. In that ATC, a disk tool magazine with many tools radially arranged is rotatably mounted on a main spindle and reciprocates with the main spindle during non-tool changing machining operations. The tool magazine can slide relative to the main spindle head only when the main spindle head reaches the automatic tool changing region which is located directly above its machining region, that is, the region wherein the main spindle head normally moves up and down for machining purposes. In a machine tool with this type of ATC, the main spindle head first is slid upwardly relative to the tool magazine to extract the used tool from the toe of the main spindle. Subsequently, the tool magazine is rotatingly indexed to allow a replacement tool to move beneath the main spindle with their respective axis aligned. The main spindle then slides downward to capture the new tool.

Serious disadvantages can exist in a machine tool having an ATC of such a construction. Because the tool magazine moves together with the main spindle head during machining operations, tools mounted on the tool magazine and extending in the radial direction can interfere with the work piece being machined, depending on the shape of the work piece. Another disadvantage is that a machine tool with such an ATC can be quite complicated in construction, be prone to develop trouble, and be relatively expensive.

SUMMARY OF THE INVENTION

The present invention is intended to remedy such shortcomings in machine tools equipped with disk-shaped tool magazines provided with radially arranged replacement tools.

It is a specific object of the present invention to provide an ATC with a tool magazine wherein tools extended from the tool magazine do not interfere with the work piece being machined.

It is another specific object of the present invention to provide a trouble-free inexpensive mechanism for allowing a series of automatic tool changing operations to be accomplished, including holding a tool, releasing the tool, extracting the tool from the main spindle, and mounting a newly indexed tool on the main spindle head.

In the machine tool having an ATC according to the present invention, a tool support for rotatably supporting a tool magazine is attached to the frame of the machine tool proper. The tool support is movable in the axial direction independently of the main spindle only above a fixed axial location, and the tool magazine is made to radially hold a number of tools in the circumferential direction so as to be able to rotatably index a desired tool past a given circumferential position. The indexed tool is arranged to arrive at the toe of the main spindle with its axis formed in line with the axis of the spindle. A first cam-and-crank mechanism in provided to move the tool support together with the main spindle head vertically over a predetermined distance during "double action" movement of the main spindle head in the automatic tool changing region, for opening and closing a tool holder attached to the tool magazine. A second cam-and-crank mechanism cooperates with the main spindle head to cause a tool holding member installed in the main spindle to release the tool attached to the toe of the main spindle during upward movement beyond the predetermined distance, and subsequently grasp the new or different tool on downward movement of the spindle. In the machine tool thus constructed, the tool magazine being supported at the fixed position on the frame does not interfere with a work piece when the main spindle is lowered into the machining region.

PREFERRED EMBODIMENT OF THE INVENTION

Figure 1:
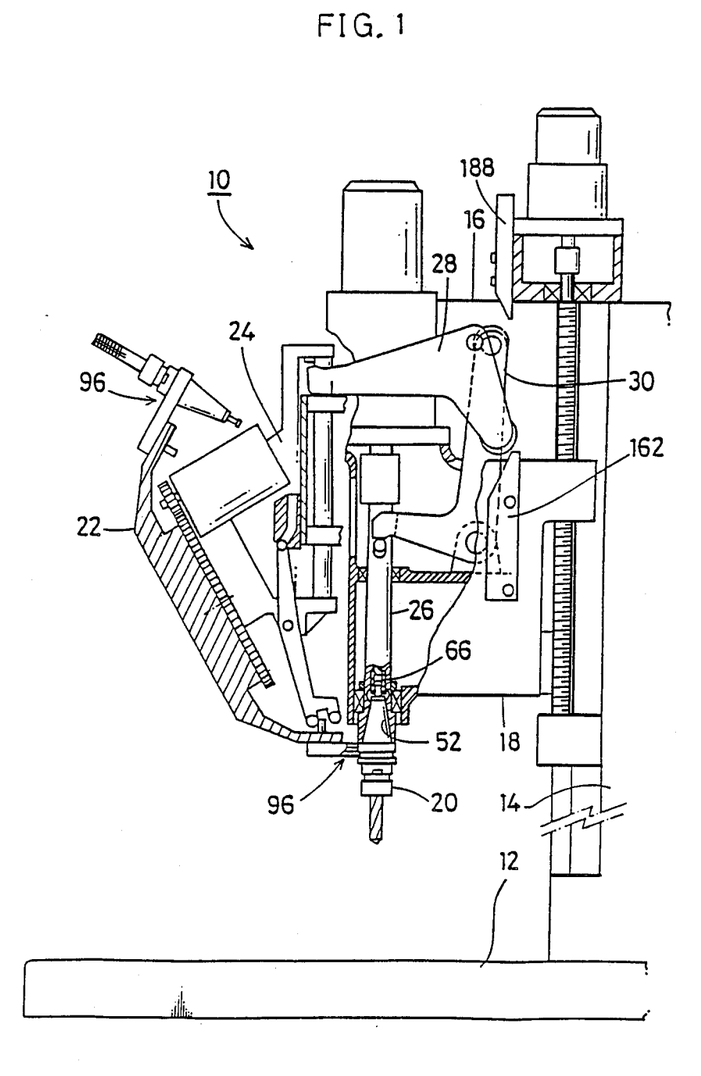
FIG. 1 is a schematic diagram illustrating an arrangement of principal members constituting a machine tool embodying the present invention.
Figures 2, 5, 6:
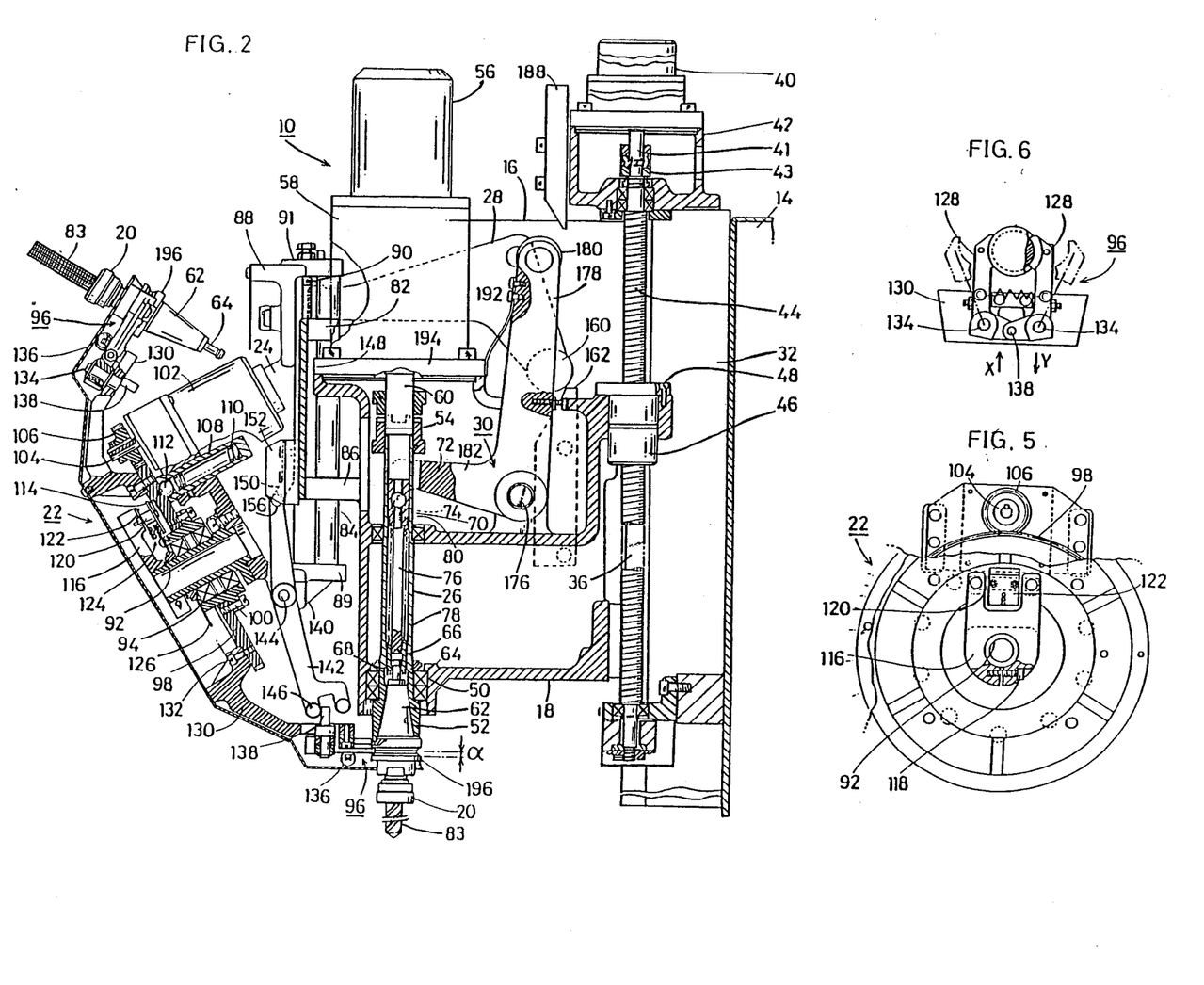
FIG. 2 is a vertical section illustrating in detail the internal structure of the machine tool of FIG. 1.
FIG. 5 is a schematic diagram of the tool magazine used in the FIG. 1 embodiment.
FIG. 6 is a schematic diagram of the tool holder used in the FIG. 1 embodiment.
Figure 3:
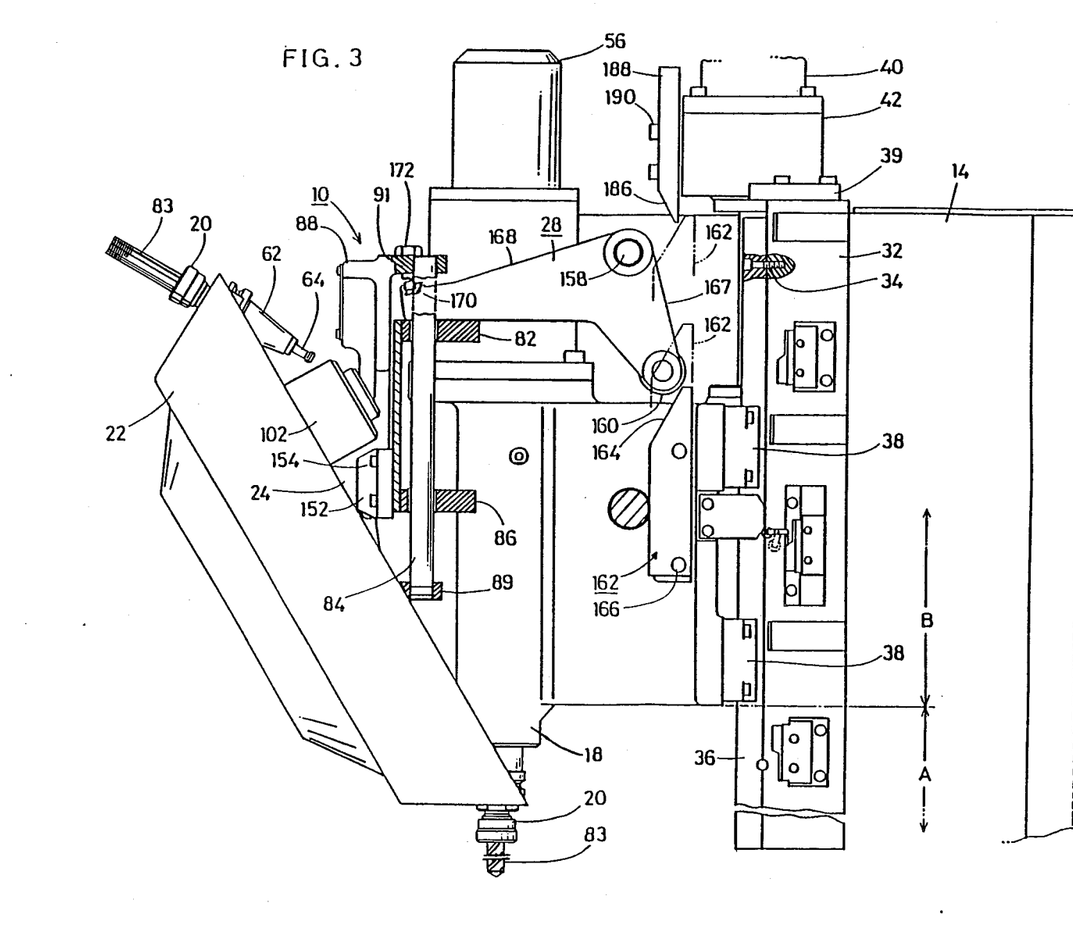
FIG. 3 is a partially cutaway side view of the machine tool of FIG. 1.

Referring now to the accompanying drawings, preferred embodiments of the present invention in the form of a machine tool will now be described in detail. FIG. 1 is a schematic diagram illustrating an arrangement of principal members constituting a machine tool embodying the present invention. FIG. 2 is a vertical section illustrating in detail the internal structure of the machine tool shown in FIG. 1. FIG. 3 is a partially cutaway side view of the machine tool depicted in FIG. 1, and FIG. 4 is a partial top view of FIG. 2 with a partial cross section as an aid for the observation of internal structure.

FIG. 1 is a schematic diagram illustrating the construction of a machine tool 10 embodying the present invention, wherein a main spindle head 18 rotatably supporting a main spindle 26 with a tool mount 52 installed at one end, is vertically movably supported by a frame 16 so that a work piece may be machined as desired. The tool mount 52 is equipped with a tool holding member 66 for holding a tool 20, the tool being axially detachable therefrom. A tool magazine 22 supplied with a plurality of tool holders 96 radially arranged, is rotatably supported by a tool support 24, and tool support 24 is supported by a frame 16 for vertically upward movement independent of the main spindle head 18. There is also a first cam-and-crank mechanism 162, 28 for causing the tool 20 installed at the toe of the main spindle 26 to be relatively held or released by the tool holder 96, and a second cam-and-crank mechanism 188, 30 for causing the tool 20 to be released and pulled out of the main spindle 26.

Figure 4:
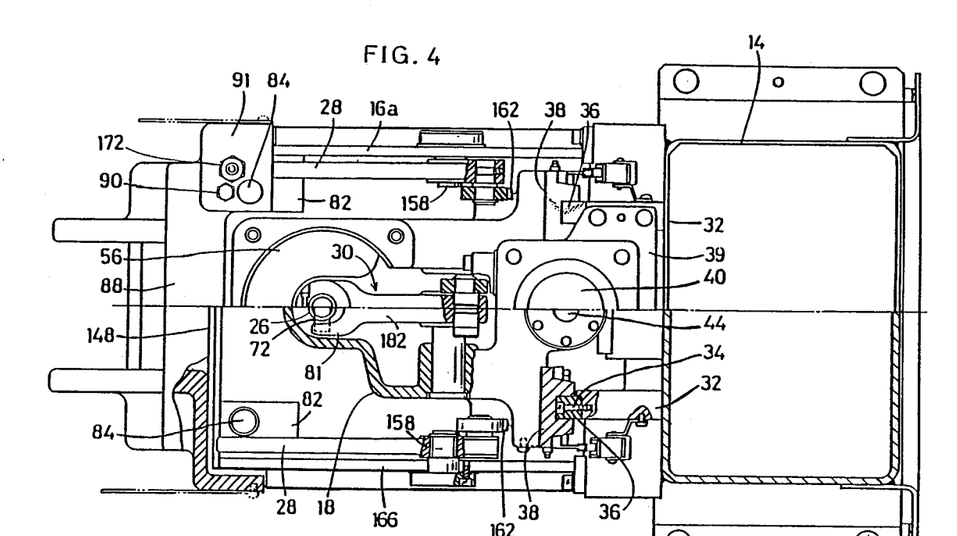
FIG. 4 is a partial top view of FIG. 2 with a partial cross section as an aid for the observation of internal structure.

Referring to FIG. 2-7, the principal construction of the machine tool embodying the present invention will now be described in greater detail. As shown in FIGS. 1-4, the rigid frame 16 formed with a box-like hollow casing, is horizontally fixed to the front face of a column 14 arranged uprightly on the base 12 of the machine tool 10. The main spindle head 18, rotatably supporting the main spindle 26, is vertically movably mounted in the frame 16. As shown in FIGS. 3 and 4, identical guide rails 36, 36' are each perpendicularly fastened respectively via screws 34 to each of the perpendicular end faces of a pair of long pillar members 32, 32' uprightly arranged and set opposite to each other in front of column 14. Left and right pairs of slide dowels 38, 38' placed a predetermined space apart in the rear of the main spindle head 18 are slidably engaged with the guide rails 36, 36' to ensure the stable vertical elevation of the main spindle head 18.

A support plate 39 is horizontally stretched between the tops of the pair of long pillar members 32, 32' and fixed thereto with bolts. An AC servomotor 40 containing a rotaty encoder 42 is uprightly arranged on the support plate 39. A ball screw 44 is fastened to the end of the vertical rotary shaft of the servomotor 40 through a coupling 43 and, as can be appreciated from FIG. 4, the ball screw 44 is perpendicularly downwardly extended between the pair of guide rails 36, 36'. As shown in FIG. 4, a nut 46 is horizontally fixed through a bolt 48 in the back projected portion of the main spindle head 18, the ball screw 44 being passed through, and engaged with, the nut 46.

When the AC servomotor 40 is activated, the ball screw 44 is rotated in the predetermined direction to cause linear movement without backlash to the nut 46, also causing the main spindle head 18 to be perpendicularly freely moved relative to the frame to the extent of a predetermined stroke. That is, the AC servomotor 40, the ball screw 44 and the nut 46 engaged therewith constitute a reciprocal driving mechanism for the main spindle head 18. The vertical stroke of the main spindle head 18, is, as discussed later, roughly divided into (1) a machining region A for causing the work piece to be machined by making a normal repetitive vertical movement and (2) an automatic tool changing region B, which is located above the region A, for allowing the tool 20 to be attached to, and be detached from, the main spindle 26 through a "double action" operation. See FIG. 3.

During the aforesaid "double action" operation which is carried out within the automatic tool changing region, the main spindle head undergoes a single reciprocation wherein a used tool is extracted from the spindle and a new or different tool is loaded. As will be more fully described later, there exist three elevational points within tool changing region B at which specific tool changing actions are initiated or completed. As a matter of course, the main spindle head 18 shown in FIGS. 1-3 is elevated up to the upper limit of the machining region A (or the lower limit of the automatic tool changing region B) upon completion of machining required for the work piece for remains in a standby position until the next machining or tool changing instructions are given.

As shown in FIG. 2, the hollow cylindrical main spindle 26 is inserted into a bearing 50 and rotatably supported thereby under the main spindle head 18. The main spindle 26 has the tool mount 52 at a lower end, and the upper end is connected to a motor 56 uprightly arranged on top of the main spindle head 18 via the output shaft 60 of a reducer 58 through a coupling 54.

As shown in FIG. 2, the tool mount 52 is designed to mount the detachable tool 20 equipped with an arbor 62 having a tapered shank, by means of a conical opening for admitting the arbor 62. A pull stud 64 is provided at the rear end of the arbor 62 of the tool 20. The tool 20 is attached to the main spindle 26 by engaging the pull stud 64 with the tool holding member 66 which is slidably inserted in the hollow main spindle 26. The tool holding member 66 is formed with a known collet so arranged as to encircle the neck of the pull stud 64 with a plurality of balls 68, and to clamp and release the pull stud 64 as the tool holding member 66 slides in the hollow portion of the main spindle 26.

As shown in FIG. 2, an annular plug 70 is vertically slidably inserted up to a predetermined height in the hollow of the main spindle 26, and the upper end of a draw bar 76 is inserted in the vertical hole in the plug 70, fixed thereto, and extends downward along the central axis of the main spindle 26. The lower end of the draw bar 76 is connected to the top of the tool holding member 66. As can be appreciated from FIG. 4, oblong slots 74 (only one being shown) opposite to each other are made in the main spindle at the position of the plug 70 and both ends of a pin 72 perpendicularly inserted in the plug 70 extend horizontally outside the main spindle 26 through the pair of slots 74.

Figure 10:
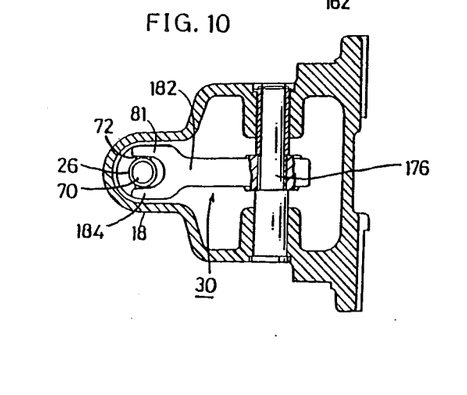
FIG. 10 is a cross sectional view illustrating a state of operation of the machine in FIG. 1 wherein a forked portion provided at the toe of a second crank is positioned above a pin horizontally projected from the main spindle.

As shown in FIG. 3, a group of compressed conical springs 78 is inserted in between the step formed in the lower hollow portion of the main spindle and a washer 80 provided at the lower end of the plug 70. The tool 20 is mounted on the tool mount 52, and the draw bar 76 is located in the central portion formed by the group of conical springs 78. The force of the conical springs 78 is used to press the plug 70 upward and hold it at the predetermined position, whereupon the tool holding member 66 is resiliently drawn up to ensure that it holds the pull stud 64. A fork 81 formed at the tip of a second crank 30 (to be described in more detail later) is, when in a non-contact state, positioned close to the upper portion of the perpendicular cross pin 72 extending outwardly from the main spindle as shown in FIGS. 2, 4 and 10. This arrangement allows the draw bar 76 to be lowered by pressing the pin 72 as the crank 30 operates. That is, the cooperative operation of the second cam-and-crank mechanism 188, 30 causes the perpendicular cross pin 72 to be forced downwardly, and the draw bar 76 to be moved accordingly. Draw bar 76, in turn, further lowers the tool holding member 66 and releases the pull stud 64 from the applied pressure derived from the balls 68, thereby releasing tool 20 from the tool mount 52. The reference character 83 in FIG. 2 designates a cutting tool such as a drill bit or tap detachably connected to the tool 20.

The tool support 24 which is supported by the frame 16 in such a manner that it is movable in the axial direction independently of the main spindle 26, will now be described in more detail. In FIG. 4, support plates 82, 82' are horizontally attached to a pair of opposite side walls 16a, 16a' constituting the frame 16. A pair of round guide rail 84, 84' are vertically fixed to the tool support 24 (in a manner to be described later), and are slidably inserted in a perpendicular throughhole suitably made in each of the respective horizontal support plates 82, 82'. As shown in FIG. 2, a pair of horizontal left and right support plates 86, 86' extend from the lower part of the frame 16, and the guide rails 84, 84' are slidably inserted in perpendicular holes in each of the horizontal support plates 86, 86'. The upper and lower ends of each of the guide rails 84, 86' are respectively fixed to a support plate 91 installed on a top plate 88 horizontally bridged over the top of the tool support 24. A support plate 89 is installed on the bottom of the support plate 91.

Accordingly, the tool support 24 can be elevated to certain heights in region B relative to the frame 16 by sliding the guide rails 84, 84' against the respective pairs of horizontal support plates 82, 86 and 82', 86' as the first cam-and-crank mechanism 162, 28 is caused to operate during the "double action" movement of the main spindle head 18. A stopper bolt 90 is fitted in the support plate 91 installed on top of the tool support 24. The height of the stopper bolt 90 is adjustable so that the tool support 24 can be held at a position having a predetermined height relative to the frame 16 when the bolt is kept stationary in the plane of the horizontal support plate 82.

The tool magazine 22 which holds many tools 20 radially arranged and which is capable of rotatingly indexing them, is supported by the tool support 24. A supporting shaft 92 having an axis diagonally downwardly inclined at a predetermined angle relative to the horizontal plane is projected from, and fixed to, the tool support 24. The tool magazine 22 is rotatably supported by the supporting shaft 92 through a bearing 94. As shown in FIGS. 2 and 5, the tool magazine 22 is a disk formed with a large diameter flat toothed wheel 98 and provided with a plurality of radially extending tool holders 96 circumferentially arranged on the outer periphery thereof. The large diameter flat wheel 98 is fixed to the bearing 94 through a bolt 100 and engaged with a pinion 106 fastened to the rotary shaft 104 of a motor 102. Motor 102, in turn, is fixed to the tool support 24. The flat wheel 98 is rotated by the motor 102 through the pinion 106 to rotate the tool magazine 22 and index a required tool 20.

As shown in FIG. 2, hollow cylindrical members 108 are arranged in suitable places on tool support 24 so that their axial lines are in parallel with that of the supporting shaft 92. A compressed spring 110 resiliently contained in each of the cylindrical members 108 press individual balls 112 against the flat wheel 98. On the flat face of the wheel 98 are provided recessed notches 114 at predetermined intervals in the circumferential direction and, by resiliently seating the balls 112 in the notches 114, the tool 20 can be click-stopped in position while a desired tool 20 is indexed.

As shown in FIGS. 2 and 5, a fork member 116 extended in the direction perpendicular to the central axis of the supporting shaft is clamped and fixed to the tip of the supporting shaft 92 through a bolt 118. A support plate 120 having a predetermined thickness is bridged over the lower side space between the forked portions of the fork member 116, and a pair of optical sensors comprising light emitting and receiving elements with their optical axes being aligned are oppositely arranged on a pair of fitting plates 122, 122'. As shown, plates 122, 122' are installed in parallel with each other and placed a thickness of the support plate 120 apart on the upper and lower faces of the support plate. A slit disc 126 rotating in combination with the tool magazine 22, and being fixed to the bearing 94, is placed in a non-contact state between the light emitting and receiving elements. Disc 126 which can pass across the light emitting and receiving elements and selectively block or unblock the light, together with the emitting and receiving elements constitutes an optical senior 124 by which instructions can be given to an electric control circuit (not shown).

The tool holder 96 arranged on the outer periphery of the tool magazine 22 will now be described. The tool holder 96 is, as shown in FIG. 6, composed of a pair of claw members 128, 128' mounted by a finger 130 to enable the claw members to simultaneously open and close. As shown in FIG. 2, a plurality of fingers 130 are fixed by bolts 132 in the peripheral direction of the flat wheel 98 forming the base of the tool magazine at a predetermined central angle, and extend in the radial direction. Each finger 130 is formed with a plate member bent at a predetermined angle, and the respective pair of claw members 128, 128' (FIG. 6) bent in a dog-legged shape are positioned a predetermined space apart on the finger 130 to be rotatable through a predetermined angle about respective pins 134. A tension spring 136 is resiliently stretched over both the members. The claw portions of the claw members 128, 128' facing each other are activated by the crank mechanism (in a manner to be described later) and caused to open and close, whereby a grooved flange 196 formed in the tool 20 can be gripped or released. As shown in FIG. 6, the other ends of the pair of dog-leg-shaped claw members 128, 128' are connected via a shaft pin 138, which projects slightly from the rear side of the finger 130. When the shaft pin 138 in FIG. 6 is urged in the Y direction, each of claw members 128, 128' closes and holds grooved flange 196 of the tool 20. On the other hand, if the shaft pin 138 is urged in the X direction, each of claw members 128, 128' will be rotated outwardly, releasing the tool 20 (shown by dashed lines in FIG. 6). The angle (relative to wheel 98) of the finger 130, each supporting one of the tool holder 96 on the outer periphery of the tool magazine 22 is set in such a manner as to make the axis of the held tool 20 coincide with the axis of the main spindle 26 when the tool 20 held by the tool holder 96 arrives at the lower side of the tool mount 52 provided at the toe of the main spindle 26, that is, when wheel 98 is rotatably indexed about shaft 92.

The mechanism for opening and closing the tool holder 96 will now be described. As shown in FIG. 2, a crevice 140 is formed en bloc in the lower face portion of the support plate 89 (to the lower end of which the guide rail 84 has been fixed) provided in the tool support 24. A bell crank 142 having a desired shape is rotatably pivotally attached to plate 89 at the crevice 140 through a pin 144. A fork 146 is formed in the lower end of the bell crank 142, with the fork located at the position where the tool holder 96 arrives at the lower side of the main spindle 26 after the rotation of the tool magazine 22. The shaft pin 138 for selectively driving the claw members 128, 128' to open or close is set in between the legs of the fork 146.

A vertical plate 148 shown in FIGS. 2 and 4 is arranged and fixed to the upper and lower horizontal support plates 82, 86 respectively attached to the frame 16, and a cam 152 (provided with a bent groove 150 of a predetermined shape) is attached to the front face of the vertical plate 148 through a bolt 154. A follower pin 156 is attached to the upper end of the bell crank 142 and is slidably inserted in the bent groove 150 of the grooved cam 152. The bell crank 142 pivotally attached to the tool support 24 is caused to elevate en bloc when the tool support 24 is elevated by the first cam-and-crank mechanism 162, 28 (to be described later). The pin 156 attached to the upper end of the bell crank 142 follows the bent groove 150 of the grooved cam 152 fixed to the frame 16, and the bell crank 142 turns slightly clockwise around the pin 144. The fork 146 of the bell crank 142 thus drives the shaft pin 138 of the tool holder 96 in the direction of the arrow Y of FIG. 6 to close the pair of the claw members 128, 128'. If the bell crank 142 turns counterclockwise, the fork 146 drives the shaft pin 138 of the tool holder 96 in the direction of the arrow X and operates to open the pair of claw members 128, 128'.

There will now be described a mechanism for elevating the tool support 24 relative to the frame 16 in the automatic tool changing region to achieve the "double action" movement of the main spindle head 18. As shown in FIGS. 2–4, the first crank 28 (having an L-shape as clearly shown in FIG. 3) is rotatably pivotally attached to each of the internal faces of the opposite side walls 16a, 16a' of the frame 16 through a shaft 158. As shown in FIG. 4, the pair of first cranks 28, 28' are arranged in the interior of the side walls 16a, 16a' respectively in opposed relation. Referring to FIG. 3, a roller 160 is rotatably installed at the end of short arm 167 of crank 28. Similar components are associated with crank 28' but are not shown in FIG. 3.

With continued reference to FIG. 3, a first plate cam 162 having a tilted cam face 164 is attached to the side face of the main spindle head 18 through a bolt 166. The first plate cam 162 is installed a predetermined space apart from, and under, the roller 160 rotatably attached to the first crank 28 to locate the main spindle head 18 at the upper limit of the automatic tool changing region B. A contact 170 is fixed to the upper end face of the long arm 168 of first crank 28. As shown in FIG. 3, contact 170 is slightly separated from the lower end of the bolt 172 screwed into the support plate 91 fixed to the top plate 88 formed in the tool support 24 en bloc.

Referring again to FIG. 3, when the main spindle head 18 is elevated by turning the servomotor 40 (to be described later), the roller 160 of the first crank 28 abuts the tilted cam face of the plate cam 162 attached to each of the side faces of the main spindle head 18 and turns the respective crank 28 clockwise around the axis 158. The contact 170 of the long arm 168 then abuts the lower end of the bolt 172 and elevates the tool support 22 along the guide rail 84 by the predetermined stroke. The dimensional ratio of the long arm 168 to the short arm 167 of the first crank 28 and the bent angle of both arms should be selected such that the elevated distance of the main spindle head 18 coincides with that of the tool support 24 elevated by the first cam-and-crank mechanism 162, 28 and such that their speeds are synchronized with each other.

A description will now be given of the second cam-and-crank mechanism, which second mechanism operates to make the tool holding member 66 provided in the tool mount 22 of the main spindle 26 release the tool 20 when the main spindle head 18 and the tool support 24 are moved in another part of the "double action" motion by the first cam-and-crank mechanism 162, 28. As shown in FIGS. 2 and 4, an L-shaped second crank 30 is installed in the main spindle head 18 to be pivotable through a predetermined rotating angle about shaft 176. A roller 180 is rotatably attached to the toe of the long arm 178 of second crank 30, whereas the toe of a short arm 182 is, as shown in FIGS. 4 and 10, formed as a fork 184. The fork 184 encloses the main spindle, as is positioned slightly above the perpendicular cross pin 72 inserted in the plug 70 provided on top of the draw bar 76. Fork 184 is in a non-contact state when the machine tool is in the tool release instruction receiving mode. Although the main spindle 26 is rotated by the motor 56 during machining, the angular position of the rotary shaft of the motor 56 is controlled to always stop at a fixed position. Accordingly, the pin 72 which extends perpendicularly to the main spindle 26 is also caused to stop at the fixed position directly beneath the fork 184 shown in FIG. 4, to ensure that the fork 184 engages pin 72 when the second crank 30 is operated.

A second plate cam 188 having a cam face with a predetermined inclination is arranged to cam the second crank 30 during elevational movment of the latter component when the main spindle head 18 is further elevated in the automatic tool changing region. In the apparatus shown in FIGS. 2 and 4, the second plate cam 188 is fixed to the perpendicular casing face of the rotary encoder 42 attached to the top of the pillar member 32 through a bolt 190, and has a tilted cam face 186 oriented perpendicularly downwardly. In operation, as the main spindle head 18 is further elevated, the roller 180 rotatably supported at the toe of the long arm 178 of the second crank 30 will be made to run on the tilted cam face 186 of the plate cam 188. As a result, the second crank 30 is turned counter-clockwise around the shaft 176 by a predetermined angle. The fork 184 provided at the toe of the short arm 182 contacts the perpendicular cross pin 72 and presses the pin 72 while forcing the draw bar 76 to drop a predetermined distance, thus lowering the tool holding member 66. Consequently, the balls attached thereto are released from the pull stud 64 and the tool 20 is also released from the tool mount 52. A laminated spring 192 is attached to the long arm of the second crank 30, and the released end of the laminated spring 192 contacts the upright end face of a horizontal support plate 194 provided on top of the main spindle head 18, whereby a clockwise return force is felt on the crank 30.

The operation of the first cam-and-crank mechanism 162, 28 always occurs prior to the operation of the second cam-and-crank mechanism 188, 30. As will be described in more detail later, when the main spindle head 18 elevated (in this embodiment) a distance of about 20mm from the basic position shown in FIG. 2 (i.e., the lower limit position of the automatic tool changing position B), the first crank 30 is caused to contact the first plate cam 162 and elevate the tool support 24 a corresponding distance of 20mm. When the main spindle head 18 is elevated to a distance of 30mm, the second crank 30 abuts the second plate cam 188, pushes up the draw bar 76 through the cam action, and releases the pull stud 64 of the tool 30 from holding the tool holding member 66.

Figure 8:
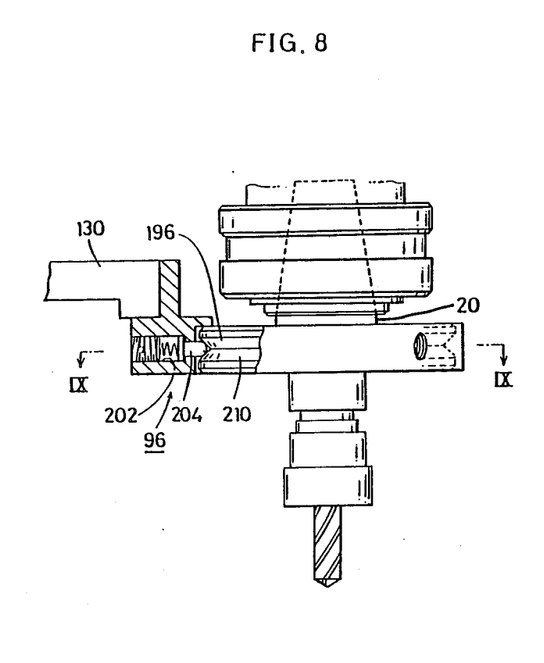
FIG. 8 is a schematic diagram of another tool holder made in accordance with the present invention.
Figure 9:
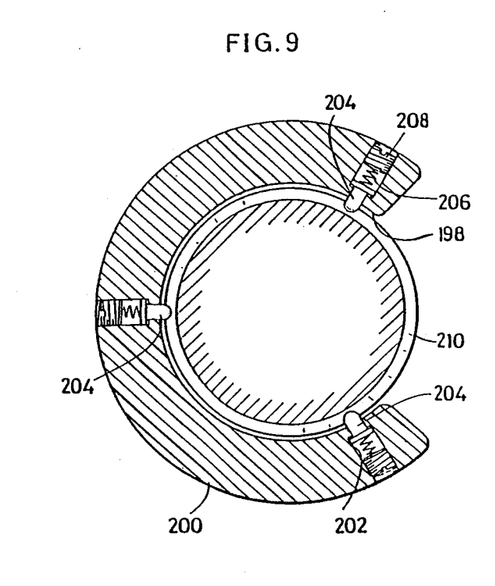
FIG. 9 is a cross sectional view of the tool holder in FIG. 8 taken on line IX—IX.

FIGS. 8 and 9 show another tool holder 96″ attached to the tool magazine 22, which tool holder is simpler in construction than that shown in FIG. 6, so that the tool is more easily replaceable. The finger 130 arranged to radially extend at the predetermined central angle in the circumferential direction of the tool magazine 22 is provided with a fixed holding member 200 having an annular opening 198 (partially cut away) wide enough to axially pass large diameter flange 196 of the tool 20″. When any particular tool holder 96″, selected by indexing the tool magazine 22, arrives beneath the main spindle head 18, the center of the annular opening 198 is aligned with the axis of the main spindle 26. Three horizontal step through-holes 202 (see FIG. 9) spaced at angles of 120° are provided in the annular base of the tool holding member 200, and bar-like projections 204 having spherical ends are inserted in the step through-holes 202 to protrude from the annular opening 198. A compressed spring 206 is resiliently inserted in each of the through-holes 202 and the force of the spring 206 is made adjustable by turning a screw 208.

As shown in FIG. 9, a crest groove 210 is provided in the periphery of the large diameter flange 196 of the tool 20 and, when the tool 20 is inserted in the annular opening 198 of the tool holding member 200, the semispherical ends of the bar-like projections 204 forcefully engage the crest groove 210 to hold the tool 20. When the main spindle head 18 is placed at the fixed position as shown in FIG. 8, the tool 20 mounted on the toe of the main spindle is held by the tool holder 96 through the aforementioned mechanism. Only when the main spindle head 18 is lowered (for a machining operation) below the standby position, the crest groove 210 of the flange 196 engaging with the bar-like projection 204 is separated from the tip thereof and the tool 20 is released.

The operation of the machine tool thus constructed will now be described. In FIG. 2, after the main spindle head 18 completes normal cutting operation, it returns to the standby position in the machining region and stops. At this point the main spindle 26 is in a position where the pin 72 crosses the short arm 182 of the second crank 30. If the next instructions are such that the cutting operation should be continued, the main spindle head 18 will enter the machining region A to machine the work piece. If, however, the instructions relate to tool changing, the main spindle head 18 will undergo a "double action" movement and enter the automatic tool changing region B (to be described later). Referring now to FIG. 2, because the shaft pin 138 of the tool holder 96 is pressed and held in the direction of X (FIG. 6) by the fork 146 of the bell crank 142, the claw members 128, 128′ are opened and the tool 20 is released. The crest groove 210 formed in the flange 196 of the tool 20 and held by the claw members 128, 128′ is located lower than the claw members 128, 128′ by a distance α ("alpha") and, without means for compensating for this offset, the tool 20 cannot be held at the fixed position even if both the claw members 128, 128′ are closed. However, as the main spindle head 18 is elevated and while it moves to from the position in FIG. 2 to that shown in FIG. 7(a), the first plate cam 162 moves and covers of distance of β until it abuts on the roller 160 installed on the first crank 28. This compensates for the crest groove 210 being positioned under the claw members 128, 128′ by the distance of α.

Figure 7A:
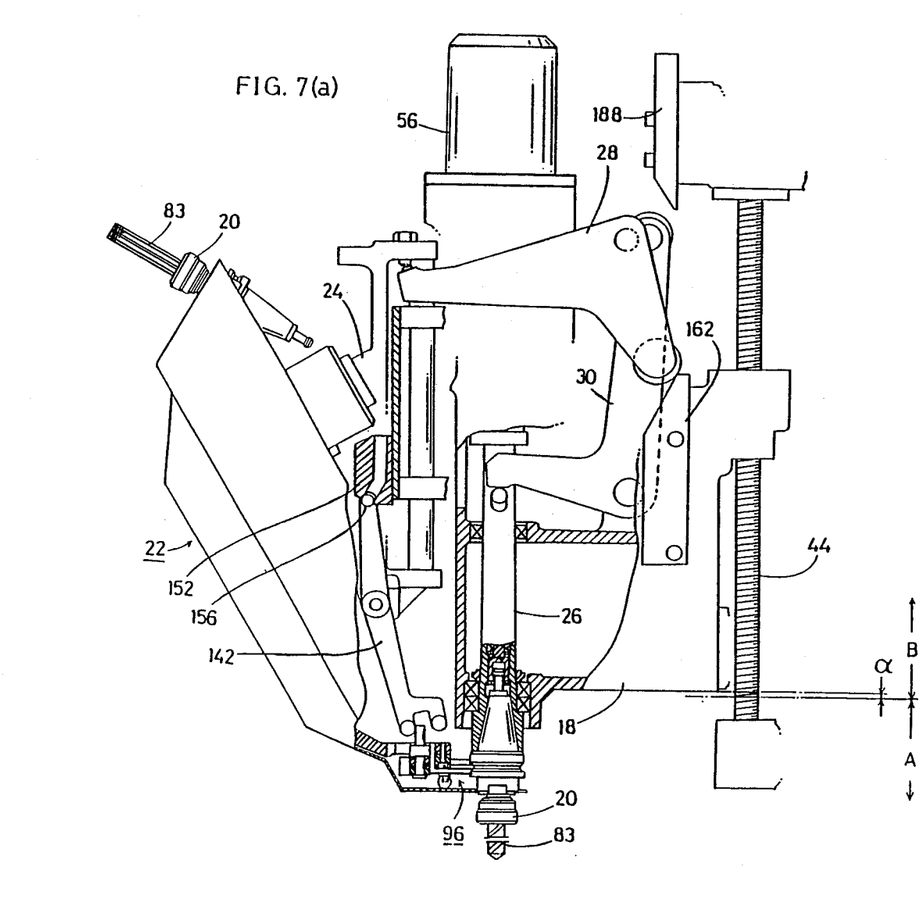
FIG. 7(a)–(d) are diagrams illustrating the order of operations of the machine tool of FIG. 1.
Figure 7B:
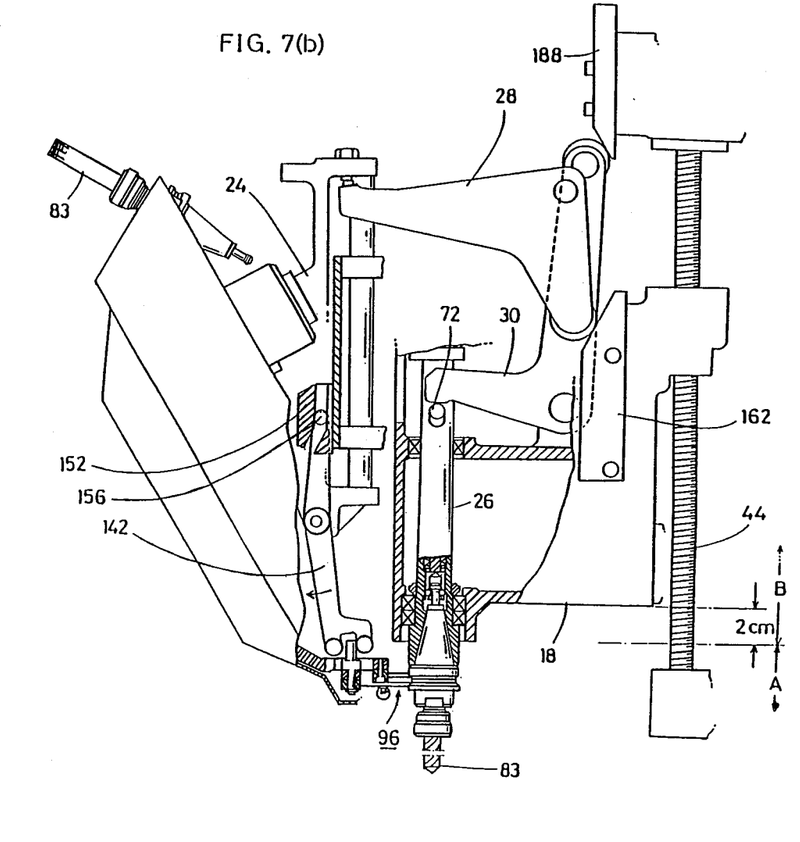

When the instructions as to tool changing are given with the machine tool in the state as shown in FIG. 2, the AC servomotor 40 is driven to turn the ball screw 44, and the main spindle head 18 is vertically elevated up to the automatic tool changing region B. The main spindle head 18 undergoes the first stage of the "double action" as depicted in FIGS. 7(a) and 7(b). That is, the main spindle head 18 at the position shown in FIG. 7(a) has been independently elevated by the distance α for reasons explained previously. The first plate cam 162 is then caused to abut on the roller 160 of the first crank 28. Then contact 170 installed on the long arm 168 of the crank 28 then engages the lower end of the bolt 172 provided on the support plate 91 of the tool support 24. At this time, the AC servomotor 40 is controlled to rotate at a very low speed in order to reduce the noise generated by the contact 170 touching the bolt 172, after which time the AC motor 20 operates at the predetermined speed.

As shown in FIG. 7(b), the main spindle head 18 is elevated a distance of, for instance, 20mm. During the elevation from FIG. 7(a) to FIG. 7(b) the first crank 28 is further turned because of the cam operation associated with the first plate cam 162 and caused to elevate the tool support 24 slidably supported by the frame 16 through the guide rail 84, together with the main spindle head 18, through essentially the same distance, in this case 20mm. As the tool support 24 is elevated the bell crank 142 pivotally attached to the upper end thereof follows the bent groove 150 of the groove cam 152. Accordingly, the bell crank 142 then drives the shaft pin 138 of the tool holder 96 in the direction of the arrow of FIG. 6, closing the pair of claw members 128, 128′ to grip flange 196 of the tool 20.

Figure 7C:
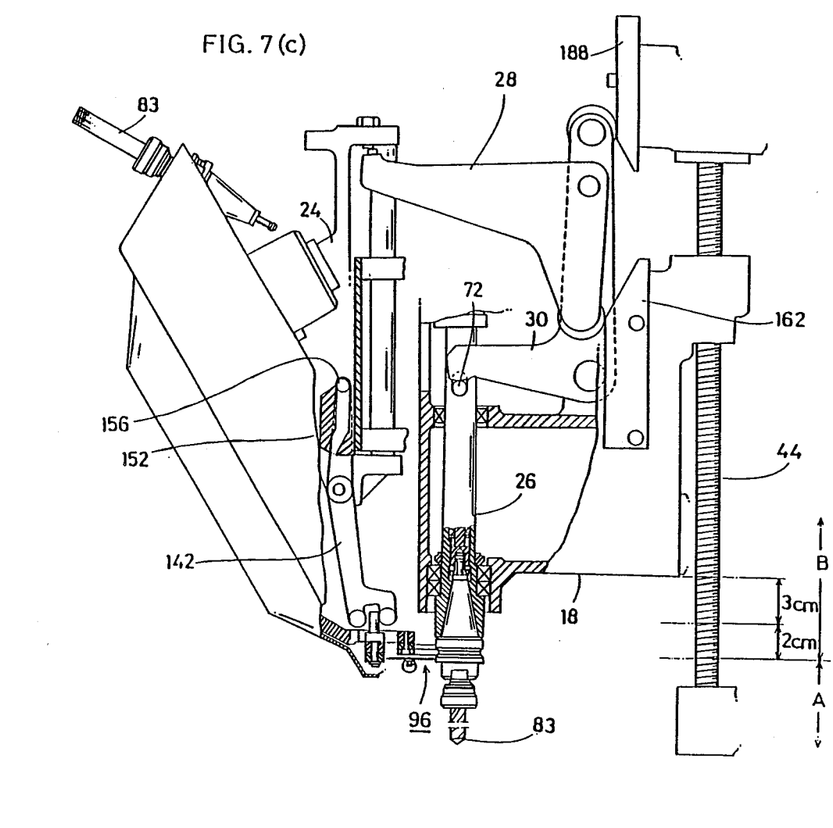

The main spindle head 18 then undergoes the second stage of the "double action" motion to the position shown in FIG. 7(c). During this second stage, because the roller 160 of the first crank 28 abuts tilted cam face 164 of the first plate cam 162, the tool support 24 together with the main spindle head 18 is elevated a greater distance, for instance, 30mm in this case. As the main spindle head 18 undergoes the second stage of the "double action" motion, the roller 180 installed on the long arm 179 of the second crank abuts the second plate cam 188 located at the upper fixed position, causing crank 30 to be turned counterclockwise around the shaft 176. The fork 184 provided at the end of the short arm 182 then contacts and depresses the perpendicular cross pin 72. As a result, the balls are released from the pull stud 64 of the tool 20, which is also released from the tool mount 56 at the toe of the main spindle 26. As mentioned previously, the tool 20 is still held by the tool holder 96 installed on the tool magazine and therefore the released tool 20 is prevented from dropping. Although the bell crank 142 attached to the tool supprt 24 is elevated relative to the groove cam 152 fixed to the frame 16, the bell crank does not undergo a camming operation because the follower pin 144 has already passed the tilted portion of the bent groove 150 and is located in the groove portion which is in parallel with the axis of the main spindle 26.

Figure 7D:
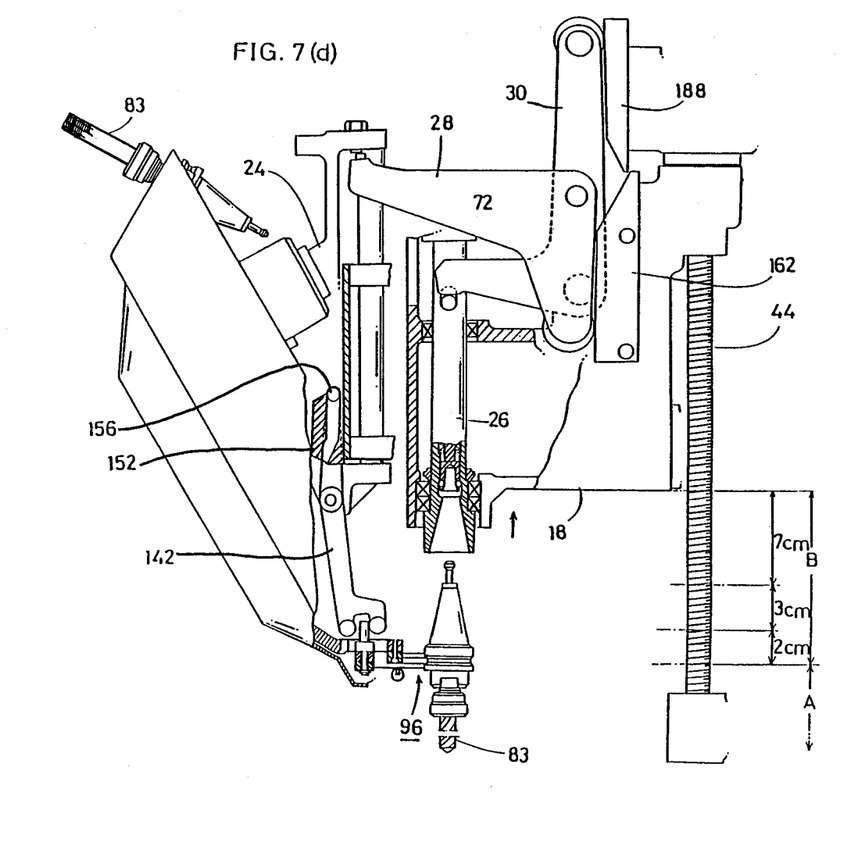

The main spindle head 18 subsequently undergoes the third stage of the "double action" motion of the present invention to the position shown in FIG. 7(d). In the third stage, spindle head 18 is elevated a still greater distance, for instance, 70mm in the present case. At this time, because the roller 160 of the first crank 28 engages the flat face of the first plate cam 162, no camming action occurs and, accordingly, only the main spindle head 18 is allowed to be elevated, and the tool support 24 is not elevated. The roller 180 of the second crank 30 runs on the flat face of the plate cam 188, resulting in no camming action of crank 30, and the draw bar 76 is kept pressed down to maintain the pull stud 64 in a release mode. As mentioned above, because the tool 20 is being held at the fixed position by the tool holder 96, the arbor 62 of the tool 20 is pulled out of the tool mount 52 at the toe of the main spindle 26 as the main spindle head 18 is elevated relative to tool support 24. The main spindle head 18 is moved up above the top of the pull stud 64 of the tool 20 held by the tool holder 96 and is stopped thereat, completing the third stage.

Subsequently, the motor 102 in the tool magazine 22 rotatingly indexes the extracted tool 20 away from the tool mount, causing a new or different tool 20' to arrive at the position under the tool mount 52 and stop in axial alignment with spindle head 18. Then the above-described operations depicted in FIGS. 7(a)–7(d) are repeated, but in reverse order, to complete the "double action" and to replace the tool automatically. That is, the main spindle head 18 is lowered by 70mm and the arbor 62 of the replacement tool is mounted on the tool mount 52. Spindle head 18 is then further lowered by 30mm to release the second crank 30 from pressing the draw bar 76, whereas the tool holding member 66 is caused to engage the pulled stud 64 of the replacement tool under action of conical springs 78. As the main spindle head 18 and the tool support 24 subsequently are lowered by 20mm, the bell crank 142 operates in reverse to press the shaft pin 138 of the tool holder 96 in the direction of X of FIG. 6 to open the claw members 128, 128', whereby the replacement tool is released from the tool support 24.

As set forth above, in the machine tool according to the present invention, the tool support for rotatably supporting the tool magazine is installed on the frame of the machine tool proper, isolated from the main spindle head but upwardly movable in the axial direction of the main spindle only above a fixed axial location, that is, above the upper limit of the machining region A. The tool magazine is so arranged as to be supported at a fixed position on the frame when the main spindle is lowered to machine a work piece in the machining region, so that tools mounted on the magazine can not interfere with the work piece. Moreover, since only vertical motion of the main spindle head in the automatic tool changing region is required for tool replacement, such a machine tool can be made simple in construction and offer many advantages.

What is claimed is:

1. A machine tool for machining a work piece, the machine tool of the type having a main spindle head rotatably supporting a main spindle with a tool mount at one end, the spindle head being reciprocable relative to the machine tool frame in the axial direction of the main spindle, the machine tool further comprising:
    a tool holding member installed in the tool mount of said main spindle;
    automatic means for changing a tool held in said tool holding member during "double action" reciprocal tool-changing movement of said spindle head, said automatic means including:
    a. a tool support carried on said frame and movable in the axial direction of said main spindle independently of said main spindle;
    b. a tool magazine rotatably supported on, and axially movable with, said tool support and having a plurality of tool holders each capable of detachably holding said tool, and spaced about the magazine periphery, said magazine for indexing a selected tool holder into and out of axial alignment with said main spindle;
    c. first cam-and-crank means interconnecting said main spindle head, said frame, and said tool support for moving said tool support together with said spindle head a predetermined distance during the "double action" movement of said main spindle head relative to said frame, the tool being held in said main spindle also being engaged to be held by one of said plurality of tool holders of the tool magazine during movement in said predetermined distance;
    d. second cam-and-crank means interconnecting said main spindle head and said frame for causing said tool holding member to release the tool from the tool holding member during a preselected portion of said "double action" movement; and
    e. means for preventing movement of said tool support below a fixed axial location, the spindle head being axially movable below said fixed location for performing machining operations, and
    wherein said tool holders are configured to provide axially unrestricted movement of the main spindle, the tool mount, said installed tool holding member, and said held tool through the axially aligned one of said tool holders for performing machining operations, when said tool is released from said one tool holder.

2. A machine tool for machining a work piece comprising:
    a frame;
    a main spindle having one end provided with a tool mount;
    a main spindle head rotatably supporting said main spindle for rotation about a spindle axis, said spindle head being reciprocable relative to said frame in the axial direction of said main spindle; and
    a tool magazine rotatably supported on said frame, said tool magazine being capable of indexing tools and having tool holding means including a plurality of tool holders disposed at an outer peripheral portion thereof, an axis of a tool held by one of the indexed tool holders being selectively alignable with said axis of said main spindle, each of said tool holders comprising a pair of claw members, said tool holder being supported on said tool magazine for axial movement with said magazine relative to said frame, said machine tool further including means responsive to axial movement of said tool magazine for activating said claw members, said tool magazine being movable between a first axial position for holding said tool and a second axial position for releasing said tool.

3. A machine tool for machining a work piece comprising:
    a frame;
    a main spindle having one end provided with a tool mount;
    a main spindle head rotatably supporting said main spindle for rotation about a spindle axis, said spindle head being reciprocable relative to said frame in the axial direction of said main spindle; and a tool magazine rotatably supported on said frame, said tool magazine being capable of indexing tools and having tool holding means including a plurality of tool holders disposed at an outer peripheral portion thereof, an axis of a tool held by one of the indexed tool holders being selectively alignable with said main spindle, each of said tool holders comprising a pair of claw members having a closed position for holding said tool and an open position for releasing said tool, wherein said main spindle head, said spindle, and said tool mount are movable between said claw members positioned in said open position during machining of said work piece.

* * * * *